US012715451B2

(12) United States Patent
Song

(10) Patent No.: US 12,715,451 B2
(45) Date of Patent: Aug. 25, 2026

(54) VEHICLE CONTROL APPARATUS AND METHOD

(71) Applicants: HYUNDAI MOTOR COMPANY, Seoul (KR); KIA CORPORATION, Seoul (KR)

(72) Inventor: Min Seok Song, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 22 days.

(21) Appl. No.: 18/815,596

(22) Filed: Aug. 26, 2024

(65) Prior Publication Data

US 2025/0276703 A1 Sep. 4, 2025

(30) Foreign Application Priority Data

Feb. 29, 2024 (KR) ........................ 10-2024-0029995

(51) Int. Cl.
*B60W 50/00* (2006.01)
*B60W 20/15* (2016.01)
*B60W 50/06* (2006.01)

(52) U.S. Cl.
CPC ........ *B60W 50/0097* (2013.01); *B60W 20/15* (2016.01); *B60W 50/06* (2013.01); *B60W 2520/10* (2013.01); *B60W 2552/15* (2020.02); *B60W 2554/804* (2020.02)

(58) Field of Classification Search
CPC .. B60W 50/0097; B60W 20/15; B60W 50/06; B60W 2554/804; B60W 2552/15; B60W 2520/10
See application file for complete search history.

(56) References Cited

U.S. PATENT DOCUMENTS

| | | | | |
|---|---|---|---|---|
| 10,974,715 | B2 | 4/2021 | Park | |
| 11,444,338 | B1 * | 9/2022 | Dhawan | H01M 50/569 |
| 2019/0202438 | A1 | 7/2019 | Park | |
| 2022/0080950 | A1 | 3/2022 | Lee | |

FOREIGN PATENT DOCUMENTS

| | | | | |
|---|---|---|---|---|
| CN | 113988403 | * 10/2021 | | G06Q 10/04 |
| KR | 20190080298 | A | 7/2019 | |
| KR | 20220036318 | A | 3/2022 | |

* cited by examiner

*Primary Examiner* — Aryan E Weisenfeld

(74) *Attorney, Agent, or Firm* — Lempia Summerfield Katz LLC

(57) ABSTRACT

A vehicle control apparatus includes a memory storing a program instruction and a processor configured to execute the program instruction. The processor is configured to provide input data at a current time point to a vehicle required power model. The input data includes at least one of a relative speed between a preceding vehicle and a host vehicle, a speed of the host vehicle, gradient information of a road ahead, or a power value of the host vehicle. The processor is also configured to calculate a model characteristic beta value to predict the required power value of the host vehicle at the future time point based on past operation data of the host vehicle. The processor is configured to predict the required power value of the host vehicle at the future time point based on the vehicle required power model and the input data at the current time point.

18 Claims, 9 Drawing Sheets

VEHICLE CONTROL APPARATUS
100

PROCESSOR
110

MEMORY
120

FIG.1

VEHICLE CONTROL APPARATUS AND METHOD

CROSS-REFERENCE TO RELATED APPLICATION

This application claims the benefit of and priority to Korean Patent Application No. 10-2024-0029995, filed on Feb. 29, 2024, the entire contents of which are hereby incorporated herein by reference.

TECHNICAL FIELD

The present disclosure relates generally to a vehicle control apparatus and method, and more particularly, to technologies for predicting required power of a vehicle.

BACKGROUND

Recently, as electric vehicles or hybrid electric vehicles have become more popular, it has become important to predict power required in the electric vehicles or the hybrid electric vehicles.

Predicting the power of the vehicle plays an important role in improving efficient driving, the use of the battery, the life management of the battery, or the efficiency of a power infrastructure.

For example, as necessary power for driving the vehicle is more accurately predicted, the fuel economy (or fuel efficiency) of the vehicle may be improved.

In the past, a technology for obtaining information about a road ahead by means of a sensor, such as radar mounted on the vehicle, and predicting power for a short range using the obtained information was used.

However, it is difficult to accurately predict power of the vehicle, which varies with a driving state of the vehicle or driving habits of the driver.

SUMMARY

The present disclosure has been made to solve the above-mentioned problems occurring in the prior art while advantages achieved by the prior art are maintained intact.

Aspects of the present disclosure provide a vehicle control apparatus and a method for predicting required power in the future by means of a prediction model trained based on past data of the vehicle.

Other aspects of the present disclosure provide a vehicle control apparatus and a method for predicting required power using only input data matched with a specific condition to minimize the amount of calculation of a prediction model.

Other aspects of the present disclosure provide a vehicle control apparatus and a method for controlling a state of charge (SOC) based on the predicted required power to improve fuel efficiency or fuel economy.

Other aspects of the present disclosure provide a vehicle control apparatus and a method for controlling a vehicle based on predicted required power to improve the marketability of the vehicle.

The technical problems to be solved by the present disclosure are not limited to the aforementioned problems. Other technical problems not mentioned herein should be more clearly understood from the following description by those having ordinary skill in the art to which the present disclosure pertains.

According to an aspect of the present disclosure, a vehicle control apparatus is provided. The vehicle control apparatus includes a memory storing a program instruction and a processor configured to execute the program instruction. The processor is configured to provide input data at a current time point to a vehicle required power model for predicting a required power value of the host vehicle at a future time point when a specific time elapses from the current time point. The input data includes at least one of a relative speed between a preceding vehicle and a host vehicle, a speed of the host vehicle, gradient information of a road ahead, or a power value of the host vehicle. The processor is also configured to calculate a model characteristic beta value to predict the required power value of the host vehicle at the future time point based on pieces of past operation data of the host vehicle. The pieces of past operation data correspond to the input data at the current time point. The processor is also configured to predict the required power value of the host vehicle at the future time point based on the vehicle required power model to which the model characteristic beta value is applied and the input data at the current time point.

In an embodiment, the processor may be configured to offset input data at a first past time point, the input data corresponding to the input data at the current time point, among the pieces of past operation data of the host vehicle. The processor may additionally be configured to obtain a past power value of the host vehicle at a second past time point when the specific time elapses from the first past time point. The processor may further be configured to match the offset input data at the first past time point with the past power value of the host vehicle at the second past time point to calculate the model characteristic beta value.

In an embodiment, the processor may be configured to offset input data at a first past time point, the input data corresponding to the input data at the current time point, among the pieces of past operation data of the host vehicle by each of respective separate times, based on determining that i) there is a plurality of time points between the current time point and the future time point when the specific time elapses from the current time point and ii) the plurality of time points are identified as time points when the respective separate times elapse from the current time point. The processor may additionally be configured to obtain past power values of the host vehicle at each of the plurality of past time points when the respective separate times elapse from the first past time point. The processor may further be configured to match each of the pieces of offset input data at the first past time point with the past power values of the host vehicle at each of the plurality of past time points, depending on the respective separate times, to calculate the model characteristic beta values every time point among the plurality of time points. The processor may further be configured to obtain a set of the model characteristic beta values, the set including the model characteristic beta values calculated for every time point among the plurality of time points.

In an embodiment, the processor may be configured to i) add the input data at the current time point to the pieces of past operation data of the host vehicle to update the pieces of past operation data of the host vehicle or ii) change the pieces of past operation data of the host vehicle to the input data at the current time point to update the pieces of past operation data of the host vehicle. The pieces of past operation data may correspond to the input data at the current time point.

In an embodiment, the processor may be configured to update the pieces of past operation data of the host vehicle based on determining that a predetermined update condition is met. The predetermined update condition may include at least one of that the host vehicle is traveling, that the preceding vehicle is detected in front of the host vehicle, that an external object is not detected within a threshold distance from the host vehicle, or that the required power value of the host vehicle at the future time point is within a range of a predetermined power value.

In an embodiment, the range of the predetermined power value may include a range of a power value for determining whether to drive an engine of the host vehicle.

In an embodiment, the processor may be configured to calculate the model characteristic beta value based on determining that that a number of the pieces of past operation data of the host vehicle is greater than a threshold number.

In an embodiment, the processor may be configured to predict the required power value of the host vehicle at the future time point, based on the vehicle required power model to which a default value of the model characteristic beta value is applied and the input data at the current time point, when the predetermined update condition is not met or the number of the pieces of past operation data of the host vehicle is less than or equal to a threshold number.

In an embodiment, the vehicle required power model may include a model using a linear least square (LSQ).

In an embodiment, the processor may be configured to control the host vehicle in an electric vehicle (EV) mode based on the required power value of the host vehicle at the future time point. The processor may additionally, or alternatively, be configured to control the host vehicle in a hybrid electric vehicle (HEV) mode based on the required power value of the host vehicle at the future time point.

According to another aspect of the present disclosure, a vehicle control method is provided. The vehicle control method includes inputting, by a processor, input data at a current time point to a vehicle required power model for predicting a required power value of the host vehicle at a future time point when a specific time elapses from the current time point. The input data includes at least one of a relative speed between a preceding vehicle and a host vehicle, a speed of the host vehicle, gradient information of a road ahead, or a power value of the host vehicle. The vehicle control method also includes calculating, by the processor, a model characteristic beta value to predict the required power value of the host vehicle at the future time point, based on pieces of past operation data of the host vehicle and the pieces of past operation data corresponding to the input data at the current time point. The vehicle control method additionally includes predicting, by the processor, the required power value of the host vehicle at the future time point based on the vehicle required power model to which the model characteristic beta value is applied and the input data at the current time point.

In an embodiment, calculating the model characteristic beta may include offsetting, by the processor, input data at a first past time point, the input data corresponding to the input data at the current time point, among the pieces of past operation data of the host vehicle. Calculating the model characteristic beta value may also include obtaining, by the processor, a past power value of the host vehicle at a second past time point when the specific time elapses from the first past time point. Calculating the model characteristic beta value may further include matching, by the processor, the offset input data at the first past time point with the past power value of the host vehicle at the second past time point to calculate the model characteristic beta value.

In an embodiment, calculating the model characteristic beta value may include identifying, by the processor, that i) there is a plurality of time points between the current time point and the future time point when the specific time elapses from the current time point and ii) the plurality of time points are time points when respective separate times elapse from the current time point. Calculating the model characteristic beta value may also include offsetting, by the processor, input data at a first past time point, the input data corresponding to the input data at the current time point, among the pieces of past operation data of the host vehicle by each of the respective separate times. Calculating the model characteristic beta value may additionally include obtaining, by the processor, past power values of the host vehicle at each of the plurality of past time points when the respective separate times elapse from the first past time point. Calculating the model characteristic beta value may further include matching, by the processor, each of the pieces of offset input data at the first past time point with the past power values of the host vehicle at each of the plurality of past time points, depending on the respective separate times, to calculate the model characteristic beta values for every time point among the plurality of time points. Calculating the model characteristic beta value may additionally include obtaining, by the processor, a set of the model characteristic beta values. The set of the model characteristic beta values includes the model characteristic beta values calculated every time point of the plurality of time points.

In an embodiment, inputting the input data at the current time point to the vehicle required power model may include i) adding, by the processor, the input data at the current time point to the pieces of past operation data of the host vehicle to update the pieces of past operation data of the host vehicle or ii) changing, by the processor, the pieces of past operation data of the host vehicle to the input data at the current time point, where the pieces of past operation data correspond to the input data at the current time point.

In an embodiment, adding the input data at the current time point to the pieces of past operation data of the host vehicle or changing the pieces of past operation data of the host vehicle to the input data at the current time point may include updating, by the processor, the pieces of past operation data of the host vehicle based on determining that a predetermined update condition is met. The predetermined update condition may include at least one of that the host vehicle is traveling, that the preceding vehicle is detected in front of the host vehicle, that an external object is not detected within a threshold distance from the host vehicle, or that the required power value of the host vehicle at the future time point is within a range of a predetermined power value.

In an embodiment, the range of the predetermined power value may include a range of a power value for determining whether to drive an engine of the host vehicle.

In an embodiment, calculating the model characteristic beta value may include calculating, by the processor, the model characteristic beta value based on determining that a number of the pieces of past operation data of the host vehicle is greater than a threshold number.

In an embodiment, predicting the required power value of the host vehicle at the future time point may include predicting, by the processor, the required power value of the host vehicle at the future time point, based on the vehicle required power model to which a default value of the model characteristic beta value is applied and the input data at the current time point, when the predetermined update condition is not met or the number of the pieces of past operation data is less than or equal to a threshold number.

In an embodiment, the vehicle required power model may include a model using a linear least square (LSQ).

In an embodiment, the vehicle control method may further include controlling, by the processor, the host vehicle in an electric vehicle (EV) mode based on the required power value of the host vehicle at the future time point. The method may additionally, or alternatively, include controlling, by the processor, the vehicle in a hybrid electric vehicle (HEV) mode based on the required power value of the host vehicle at the future time point.

BRIEF DESCRIPTION OF THE DRAWINGS

The above and other objects, features, and advantages of the present disclosure should be more apparent from the following detailed description taken in conjunction with the accompanying drawings, in which:

FIG. 1 is a block diagram illustrating a vehicle control apparatus, according to an embodiment of the present disclosure;

DETAILED DESCRIPTION

Figure 2:
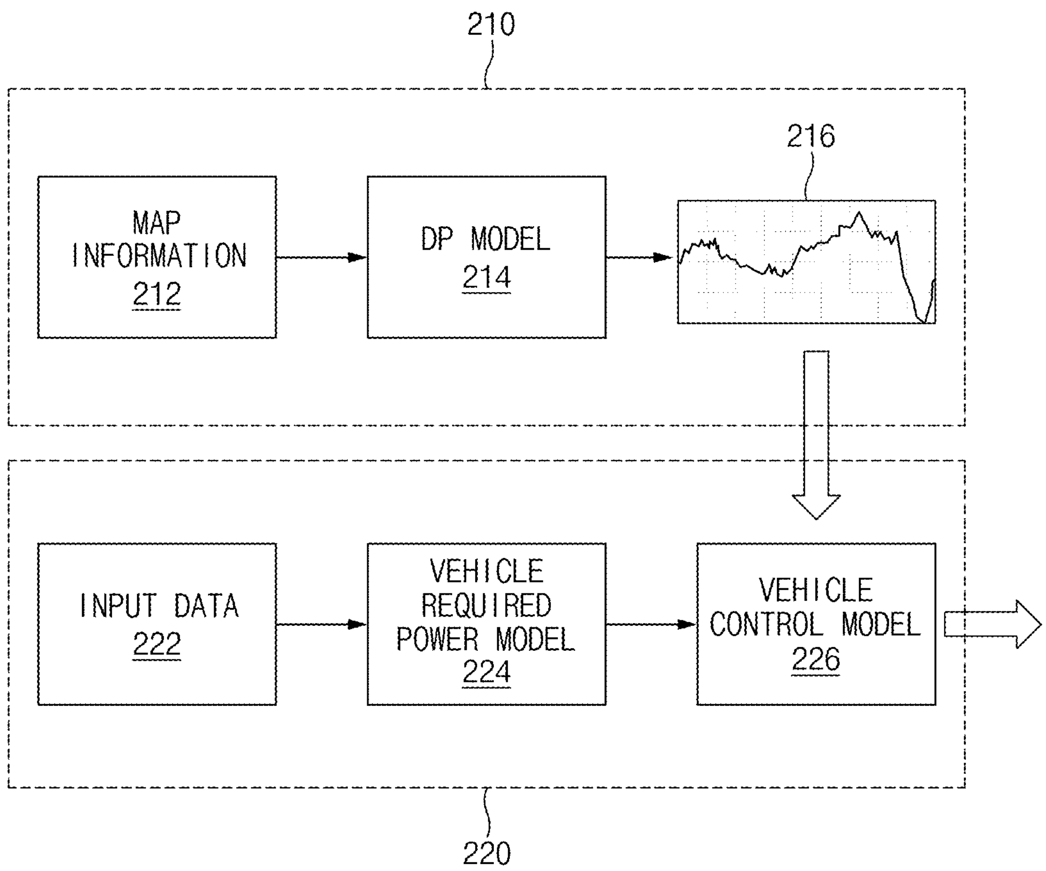
FIG. 2 is a block diagram illustrating an example in which a result calculated according to a vehicle required power model of a vehicle control apparatus according to an embodiment of the present disclosure and a result calculated according to a dynamic programming (DP) model are applied to a vehicle control model.

Hereinafter, embodiments of the present disclosure are described in detail with reference to the accompanying drawings. In adding the reference numerals to the components of the drawings, it should be noted that the identical components are designated by the identical numeral even when the components are displayed on different drawings. In addition, a detailed description of well-known features or functions has been omitted where it was determined that the detailed description would unnecessarily obscure the gist of the present disclosure.

In describing components of embodiments of the present disclosure, the terms first, second, A, B, (a), (b), and the like may be used herein. These terms are only used to distinguish one component from another component. These terms do not limit the corresponding components irrespective of the order or priority of the corresponding components. The expression "at least one of A, B, C, or any combination thereof" may include "A", "B", or "C", or "A and B", "B and C", "A and C", or "A, B, and C", which is a combination thereof.

Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings equal to the contextual meanings in the relevant field of art. The terms should not be interpreted as having ideal or excessively formal meanings unless clearly defined as having such in the present disclosure.

When a component, device, element, or the like of the present disclosure is described as having a purpose or performing an operation, function, or the like, the component, device, or element should be considered herein as being "configured to" meet that purpose or perform that operation or function.

Figure 1:
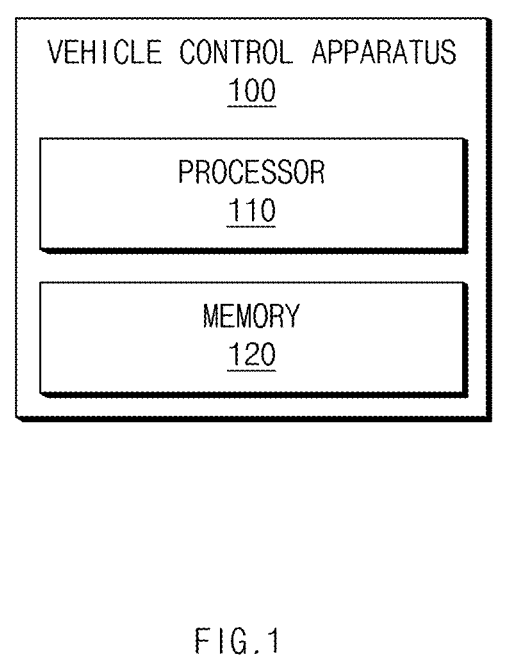

Hereinafter, embodiments of the present disclosure are described in detail with reference to FIGS. 1-9.

FIG. 1 is a block diagram illustrating a vehicle control apparatus, according to an embodiment of the present disclosure.

According to an embodiment, a vehicle control apparatus 100 may include a processor 110 and a memory 120. The components of the vehicle control apparatus 100 that are shown in FIG. 1 are illustrative, and embodiments of the present disclosure are not limited thereto. For example, the vehicle control apparatus 100 may further include components that are not shown in FIG. 1.

According to an embodiment, the memory 120 may store a command or data. For example, the memory 120 may store one instruction, or two or more instructions, that, when executed by the processor 110, cause the vehicle control apparatus 100 to perform various operations.

According to an embodiment, the memory 120 and the processor 110 may be implemented as one chipset and may store various pieces of information associated with the vehicle control apparatus 100. For example, the memory 120 may store information about an operation history of the processor 110.

According to an embodiment, the memory 120 may include a non-volatile memory (e.g., a read only memory (ROM)) and a volatile memory (e.g., a random access memory (RAM)). For example, the memory 120 may store past operation data of a host vehicle, input data, a past power value of the host vehicle, a model characteristic beta value, or the like.

According to an embodiment, a host vehicle associated with the vehicle control apparatus 100 may be a hybrid electric vehicle (HEV). The HEV may include an engine, a motor, an engine clutch for selectively connecting the engine and the motor, a transmission, a differential gear device, or a battery. Furthermore, the HEV may include a hybrid starter & generator (HSG) for starting the engine or being generated by an output of the engine. The HSG may be referred to as an integrated starter & generator (ISG).

According to an embodiment, the vehicle control apparatus 100 may control the vehicle based on a control mode including at least one of an electric vehicle (EV) mode using power of the motor, an engine mode using power of the engine, an HEV mode for using power of the motor as auxiliary power while using power of the engine as main power, a regenerative braking mode for collecting braking and inertial energy by means of generation of the motor upon driving (or operation) due to braking and inertial of the vehicle to charge the battery, or any combination thereof.

According to an embodiment, the processor 110 may provide input data at a current time point to a vehicle required power model for predicting a required power value of the host vehicle at a future time point when a specific time elapses from the current time point.

According to an embodiment, the input data at the current time point may include a relative speed between the host vehicle and the host vehicle, a speed of the host vehicle, gradient information of a road ahead, and/or a power value of the host vehicle.

According to an embodiment, the input data may be obtained by means of a sensor of the host vehicle.

According to an embodiment, the sensor may include one or more sensors. For example, the sensors may be attached to different positions of the vehicle. The sensors may face one or more different directions. For example, the sensors may be attached to the front, sides, rear, and/or roof of the vehicle to face directions, such as forward-facing, rear-facing, and/or side-facing.

In an embodiment, the sensor may be an image sensor such as a high dynamic range camera. For example, the sensor may include a non-visual sensor. For example, the sensor may include radio detection and ranging (RADAR), light detection and ranging (LiDAR), or an ultrasonic sensor, in addition to, or instead of, the image sensor.

In an embodiment, the sensor may include a yaw sensor, a roll sensor, a pitch sensor, a collision sensor, a wheel sensor, a speed sensor, a tilt sensor, a weight sensor, a heading sensor, a gyro sensor, a position module, a moving object forward/backward sensor, a battery sensor, a fuel sensor, a tire sensor, a steering sensor according to steering wheel rotation, a moving object internal temperature sensor, a moving object internal humidity sensor, an ultrasonic sensor, an illumination sensor, an accelerator pedal position sensor, and/or a brake pedal position sensor.

In an embodiment, the vehicle control apparatus 100 may obtain sensing data for moving object posture information, moving object collision information, moving object direction information, moving object position information (or GPS information), moving object angle information, moving object speed information, moving object acceleration information, moving object tilt information, moving object forward/backward information, battery information, fuel information, tire information, moving object lamp information, moving object internal temperature information, moving object internal humidity information, a steering wheel rotation angle, moving object external illumination, pressure applied to the accelerator pedal, and/or pressure applied to the brake pedal, by means of the sensor.

According to an embodiment, the relative speed of the preceding vehicle and the host vehicle may be calculated based on a headway distance between the preceding vehicle and the host vehicle and a speed of the preceding vehicle. The relative speed of the preceding vehicle and the host vehicle may have a positive value or a negative value depending on a speed difference between the host vehicle and the preceding vehicle.

According to an embodiment, the gradient information of the road ahead may include information about a slope of the road ahead. The gradient information of the road ahead may be included as a value corresponding to an angle.

According to an embodiment, the required power value of the host vehicle may include a power value necessary to operate the host vehicle. For example, the required power value of the vehicle may include an output necessary for the host vehicle to travel at a specific speed or specific torque.

According to an embodiment, the vehicle required power model may include an algorithm for predicting a required power value of the host vehicle at the future time point when the specific time elapses from the current time point. As another example, the vehicle required power model may include a recognition model, implemented with software or hardware, that simulates a computational capability of a biological system using at least one artificial neuron (or node). The vehicle required power model may predict a required power value of the host vehicle at the future time point based on the input data.

According to an embodiment, the vehicle required power model may include a model using a linear least square (LSQ). For example, the LSQ may include a method for approximating a solution equation of a certain system. In detail, the LSQ may include a method for obtaining a solution in which the sum of squares of an error between the approximated solution and an actual solution is minimized.

According to an embodiment, the processor 110 may calculate a model characteristic beta value to predict a required power value of the host vehicle at the future time point, based on past operation data of the host vehicle, corresponding to the input data at the current time point, that is input to the vehicle required power model.

According to an embodiment, the past operation data of the host vehicle may include various pieces of data associated with past operation of the host vehicle. For example, the past operation data of the host vehicle may include past input data associated with operation of the host vehicle, a past power value of the host vehicle according to the past input data, or the like. In an embodiment, the past input data of the host vehicle may include at least one of a speed of the host vehicle, gradient information of the road ahead, gradient information of the road, a relative speed between the preceding vehicle and the host vehicle, or any combination thereof. The past power value of the host vehicle may include information about a power value consumed as the host vehicle operated in the past. For example, the past power value of the host vehicle may be associated and stored with past input data.

According to an embodiment, the past operation data of the host vehicle may be stored in the memory 120. For example, the past operation data of the host vehicle may be stored in the form of a matrix.

According to an embodiment, the processor 110 may identify the past operation data of the host vehicle. The past operation data may correspond to the input data at the current time point. For example, the processor 110 may identify the same data as the input data at the current time point among the pieces of past operation data of the host vehicle.

According to an embodiment, in identifying past operation data of the host vehicle, that corresponds to specific input data at the current time point, the processor 110 may consider input data different from the specific input data together. For example, when identifying data corresponding to a speed of the host vehicle at the current time point among the pieces of past operation data of the host vehicle, the processor 110 may also consider whether the data corresponds to gradient information at the current time point. As a detailed example, although the speed of the host vehicle on the past operation data of the host vehicle and the speed of the host vehicle at the current time point are the same as each other, if the speeds are speeds on roads with different gradients, the processor 110 may fail to identify the speed of the host vehicle on the past operation data as the same data as the speed of the host vehicle at the current time point.

According to an embodiment, the model characteristic beta value may include a linear model value for generating a required power value (or a predicted value) using input data (or a measured value). For example, the model characteristic beta value may include a linear model value for calculating a required power value at the future time point using the input data at the current time point.

According to an embodiment, the model characteristic beta value may be calculated based on Equations 1 and 2 below.

$$Y(\text{output}) = \text{Beta} \times X(\text{input}) \quad \text{[Equation 1]}$$

$$\text{Beta}(t*) = \left(X^T X\right)^{-1} X^T Y(t*) \quad \text{[Equation 2]}$$

According to an embodiment, in Equation 1 above, X (input) may be the input data, Y (output) may be the required power value of the host vehicle, and Beta may be the model characteristic beta value.

According to an embodiment, the model characteristic beta value Beta may be calculated for each of pieces of input data. For example, the processor 110 may separately calculate a model characteristic beta value about the relative speed, a model characteristic beta value about the speed of the host vehicle, a model characteristic beta value about the gradient information of the road ahead, or a model characteristic beta value about the power value of the host vehicle.

For example, the model characteristic beta value may be calculated based on a least squared method. The model characteristic beta value may include a linear model value for a future time point t* when a specific time elapses from a current time point. In an embodiment, the processor 110 may calculate a model characteristic beta value by means of matrix operations.

According to an embodiment, the processor 110 may predict a required power value of the host vehicle at the future time point based on the vehicle required power model to which the model characteristic beta value is applied and the input data at the current time point.

According to an embodiment, the processor 110 may calculate a predicted value based on Equation 3 below. The calculated predicted value may include the required power value of the host vehicle at the future time point.

$$\text{Pred\_Results}(t*) = Beta0(t*) + Beta1(t*) \times input1 + Beta2(t*) \times input2 + \ldots \quad \text{[Equation 3]}$$

According to an embodiment, the processor 110 may calculate each model characteristic beta value (Beta0, Beta1, Beta2 . . . ) for each of pieces of different input data. For example, each model characteristic beta value (Beta0, Beta1, Beta2 . . . ) may refer to each model constant for a different measurement constant (input1, input2, . . . ).

For example, the predicted value Pred_Results (t*) may include a required power value of the host vehicle at a future time point when a specific time t* elapses from the current time point. As another example, if t*=0, the predicted value Pred_Results(t*) may refer to a power value of the host vehicle at the current time point.

According to an embodiment, the processor 110 may offset input data at a first past time point, that corresponds to the input data at the current time point, among the pieces of past operation data of the host vehicle, by a specific time to calculate the model characteristic beta value. The processor 110 may obtain a past power value of the host vehicle at a second past time point when the specific time elapses from the first past time point. The specific time may include a time from the current time point to the future time point when there is a need to predict the required power value of the host vehicle.

According to an embodiment, the processor 110 may identify past operation data corresponding to the input data at the current time point among the pieces of past operation data of the host vehicle and may identify a time point of the past operation data as the first past time point. The processor 110 may obtain a past power value of the host vehicle at the second past time point when the specific time elapses from the first past time point.

According to an embodiment, the processor 110 may offset input data at the first past time point by the specific time and may match the offset input data at the first past time point with the past power value of the host vehicle at the second past time point.

According to an embodiment, the processor 110 may match the offset input data at the first past time point with the past power value of the host vehicle at the second past time point to calculate the model characteristic beta value. For example, the processor 110 may calculate a model characteristic beta value capable of obtaining the past power value of the host vehicle at the second past time point by means of the input data at the first past time point.

For example, although the past power value of the host vehicle at the second past time point is a power value according to the input data at the second past time point, the processor 110 may calculate the model characteristic beta value capable of obtaining the past power value of the host vehicle at the second past time point based on the input data at the first past time point. In other words, the processor 110 may apply the model characteristic beta value to the input data at the first past time point to obtain the past power value of the host vehicle at the second past time point.

Likewise, the calculated model characteristic beta value may be used to predict the required power value of the host vehicle at the future time point based on the input data at the current time point.

For example, the processor 110 may apply the model characteristic beta value calculated from the past operation data of the host vehicle to the input data at the current time point to predict the required power value of the host vehicle at the future time point.

According to an embodiment, there may be a plurality of time points between the current time point and the future time point when the specific time elapses from the current time point. The processor 110 may identify each of the plurality of time points as a time when each separate time elapses from the current time point.

The specific time may include a time from the current time point to the future time point when there is a need to predict the required power value of the host vehicle. The separate time may include a time from the current time point to each of the plurality of time points.

For example, if the future time point to be predicted by the processor 110 is a time point when 5 seconds elapse from the current time point, the specific time may be 5 seconds. At this time, there may be a plurality of time points at intervals of 1 second from the current time point to the future time point. For example, the plurality of time points may include a time point after 1 second from the current time point, a time point after 2 seconds from the current time point, a time point after 3 seconds from the current time point, and a time point after 4 seconds from the current time point. Therefore, separate times for the plurality of time points may be 1 second, 2 second, 3 seconds, and 4 seconds.

According to an embodiment, the processor 110 may identify past operation data corresponding to the input data at the current time point among the pieces of past operation data of the host vehicle and may identify a time point of the past operation data as the first past time point. The processor 110 may obtain past power values of the host vehicle at each of the plurality of past time points when the respective separate times elapse from the first past time point. For example, if the separate times are 1 second, 2 seconds, 3 seconds, and 4 seconds, the processor 110 may identify a past power value after 1 second from the first past time point, a past power value after 2 seconds from the first past time point, a past power value after 3 seconds from the first past time point, and a past power value after 4 seconds from the first past time point.

According to an embodiment, the processor 110 may offset the input data at the first past time point by the respective separate times and may match each of the pieces of offset input data at the first past time point with past power values at each of the plurality of past time points.

According to an embodiment, the processor 110 may match each of the pieces of offset input data at the first past time point with the past power values at each of the plurality of time points, thus calculating model characteristic beta values for every time point among the plurality of time points.

For example, the processor 110 may respectively identify the plurality of past time points when the respective separate times elapse from the first past time point as a second past time point, a third past time point, a fourth past time point, and a fifth past time point. In this case, the processor 110 may calculate a model characteristic beta value for the second past time point, a model characteristic beta value for the third past time point, a model characteristic beta value for the fourth past time point, and a model characteristic beta value for the fifth past time point. For example, the processor 110 may calculate each of model characteristic beta values capable of obtaining the past power value at each of the plurality of past time points by means of the input data at the first past time point.

According to an embodiment, the processor 110 may apply each of the model characteristic beta values calculated for every time point among the plurality of past time points to the input data at the first past time point to obtain past power values of the host vehicle for every time point among the plurality of past time points.

Likewise, the model characteristic beta values calculated for every time point among the plurality of past time points may be used to predict the required power value of the host vehicle at the future time point based on the input data at the current time point.

For example, the processor 110 may sum values obtained by applying each of the model characteristic beta values calculated every time point among the plurality of past time points to the input data at the current time point to predict the required power value of the host vehicle at the future time point.

According to an embodiment, the processor 110 may configure a set of the model characteristic beta values calculated for every time point among the plurality of time points.

For example, the processor 110 may configure a set of a plurality of model characteristic beta values for specific input data. In this case, the processor 110 may improve the accuracy of predicting the required power value of the host vehicle at the future time point based on the vehicle required power model to which the input data at the current time point and the set of the plurality of model characteristic beta values are applied.

According to an embodiment, the processor 110 may add the input data at the current time point to the past operation data of the host vehicle or may change the past operation data of the host vehicle, that corresponds to the input data at the current time point, to the input data at the current time point, thus updating the past operation data of the host vehicle.

For example, if there is no data corresponding to the input data of the host vehicle at the current time point among the pieces of past operation data, the processor 110 may add the input data at the current time point to the pieces of past operation data. As another example, if there is data corresponding to the input data of the host vehicle at the current time point among the pieces of past operation data, the processor 110 may replace the past operation data with the input data at the current time point.

According to an embodiment, the processor 110 may update the past operation data of the host vehicle based on determining only that a predetermined update condition is met.

For example, the predetermined update condition may include at least one of the following: that the host vehicle is traveling, that a preceding vehicle is detected in front of the host vehicle, that an external object is not detected within a threshold distance from the host vehicle, that the required power value of the host vehicle at the future time point is within a range of a predetermined power value, or any combination thereof.

According to an embodiment, input data may affect a prediction model for predicting a required power value of the host vehicle only when the predetermined update condition is met. Therefore, the processor 110 may update past operation data only when the predetermined update condition is met, thus preventing data with small importance from being stored in the past operation data.

According to an embodiment, pieces of input data obtained in a state in which the host vehicle is stopped may include a plurality of pieces of data with small importance. Therefore, the processor 110 may fail to update input data obtained if the host vehicle is stopped.

According to an embodiment, the processor 110 may detect a preceding vehicle that is located in front of the host vehicle by means of the sensor. The processor 110 may calculate a relative speed between the preceding vehicle and the host vehicle based on determining that the preceding vehicle is detected in front of the host vehicle. For example, the processor 110 may calculate at least one of a headway distance between the preceding vehicle and the host vehicle, a speed of the preceding vehicle, or any combination thereof, based on determining that the preceding vehicle is detected in front of the host vehicle. The processor 110 may calculate a relative speed between the preceding vehicle and the host vehicle based on the headway distance between the preceding vehicle and the host vehicle and the speed of the preceding vehicle. As such, as the preceding vehicle should be detected to calculate the relative speed between the preceding vehicle and the host vehicle, the processor 110 may update the past operation data of the host vehicle if the preceding vehicle is detected in front of the host vehicle.

According to an embodiment, the processor 110 may detect an external object within a threshold distance from the host vehicle by means of the sensor. The threshold distance may be set to a distance at which the external object is able to interfere with normal driving of the host vehicle. For example, if the external object is detected within the threshold distance from the host vehicle, the processor 110 may fail to update input data at the corresponding time point to the past operation data.

According to an embodiment, the processor 110 may update the past operation data, only if the required power value of the host vehicle at the future time point is within the range of the predetermined power value.

According to an embodiment, input data obtained if the processor 110 drives the engine, in predicting the required power value of the host vehicle, may have small importance.

Therefore, the range of the predetermined power value may include a range of a power value for determining whether to drive the engine of the host vehicle. For example, the range of the predetermined power value may be set to a range within a minimum power value and a maximum power value for determining whether to drive the engine of the host vehicle. As an example, the range of the predetermined power value may be set to a range within 20 kW from 0 kW.

According to an embodiment, the processor 110 may calculate a model characteristic beta value based on determining that the number of the pieces of past operation data of the host vehicle is greater than a threshold number.

According to an embodiment, the threshold number may include the number of pieces of past operation data enough for the processor 110 to calculate a model characteristic beta value by means of the vehicle required power model. For example, the threshold number may include a number capable of calculating a model characteristic beta value in which the accuracy of the vehicle required power value predicted by the processor 110 is sufficiently great.

According to an embodiment, if the update condition is not met or the number of the pieces of past operation data is less than or equal to the threshold number, the processor 110 may predict a required power value of the host vehicle at the future time point based on the vehicle required power model to which a default value of the model characteristic beta value is applied and the input data at the current time point.

According to an embodiment, the default value of the model characteristic beta value may include a default value for predicting a required power value of the vehicle. For example, the default value of the model characteristic beta value may be differently set according to a vehicle type. For example, the default value of the model characteristic beta value may be set to a value uniformly applied without regard to the past operation data of the host vehicle.

According to an embodiment, if the update condition is not met, the processor 110 may predict a required power value of the host vehicle at the future time point without using the past operation data of the host vehicle. For example, if the update condition is not met, the processor 110 may predict a required power value of the host vehicle at the future time point using the vehicle required power model to which the default value of the model characteristic beta value is applied.

According to an embodiment, if the number of the pieces of past operation data is less than or equal to the threshold number, the processor 110 may predict a required power value of the host vehicle at the future time point based on the vehicle required power model to which the default value of the model characteristic beta value is applied.

According to an embodiment, the processor 110 may control the host vehicle in an electric vehicle (EV) mode based on the required power value of the host vehicle at the future time point. Additionally, or alternatively, the processor 110 may control the vehicle in a hybrid electric vehicle (HEV) mode based on the required power value of the host vehicle at the future time point.

For example, the processor 110 may control the host vehicle such that the required power value of the host vehicle at the future time point, that is predicted using the model characteristic beta value, is able to be output. At this time, the processor 110 may calculate a control amount capable of outputting a required power value of the host vehicle at optimal fuel efficiency or fuel economy.

For example, the processor 110 may control a state of charge (SOC) such that the required power value of the host vehicle at the future time point, that is predicted using the model characteristic beta value, is able to be output.

FIG. 2 is a block diagram illustrating an example in which a result calculated according to a vehicle required power model of a vehicle control apparatus according to an embodiment of the present disclosure and a result calculated according to a dynamic programming (DP) model are applied to a vehicle control model.

According to an embodiment, a DP model 214 may be included in a first layer 210, and a vehicle required power model 224 and a vehicle control model 226 may be included in a second layer 220. For example, the first layer 210 may be referred to as an upper layer including a DP algorithm and associated with global plan planning. The second layer 220 may be referred to as a lower layer including at least one of the vehicle required power model 224 or the vehicle control model 226 and associated with local path planning.

According to an embodiment, the vehicle control apparatus may obtain ratio information from map information in the first layer 210. The vehicle control apparatus may control a vehicle using the ratio information obtained in the first layer 210 and the predicted result of the vehicle required power model 224.

According to an embodiment, the DP model 214 may calculate ratio information 216 based on at least one of map information 212, average speed information, or any combination thereof. As an example, the ratio information 216 may include state of charge (SOC) information. As another example, the ratio information 216 may include ratio information about a partial route in which the vehicle is located among a plurality of partial routes.

According to an embodiment, the map information 212 may include at least one of gradient information of a road ahead, a speed limit of the road ahead, traffic volume on the road ahead, or any combination thereof.

For example, the vehicle control apparatus according to an embodiment of the present disclosure may receive the map information 212 or navigation information from an external server via its communication circuit. The map information 212 may include information about a gradient degree of the road, which is included in three-dimensional (3D) map data, information about a speed limit, or information about a traffic speed, which is included in transport protocol expert group (TPEG) data.

According to an embodiment, in the second layer 220, input data 222 applied to the vehicle required power model 224 may include a relative speed between a preceding vehicle and a host vehicle, a speed of the host vehicle, a speed of the preceding vehicle, and/or gradient information of the road ahead.

According to an embodiment, the vehicle required power model 224 may apply a model characteristic beta value to the input data 222 to predict a required power value of the vehicle at a future time point. For example, the vehicle required power model 224 may calculate a speed of the vehicle at the future time point or the required power value of the vehicle at the future time point.

According to an embodiment, the vehicle control model 226 may calculate an optimal control amount using a predicted value calculated by means of the vehicle required power model 224 and the ratio information 216 calculated in the first layer 210. For example, the optimal control amount may be calculated using an amount of fuel and an SOC.

According to an embodiment, the vehicle control apparatus may control the host vehicle in an electric vehicle (EV) mode based on the calculated optimal control amount. Additionally, or alternatively, the vehicle control apparatus may control the host vehicle in a hybrid electric vehicle (HEV) mode based on the calculated optimal control amount.

Referring to FIG. 2, according to an embodiment, the vehicle control apparatus may improve fuel efficiency or fuel economy depending on the result calculated by means of the model included in the first layer 210 and the model included in the second layer 220.

Figure 3:
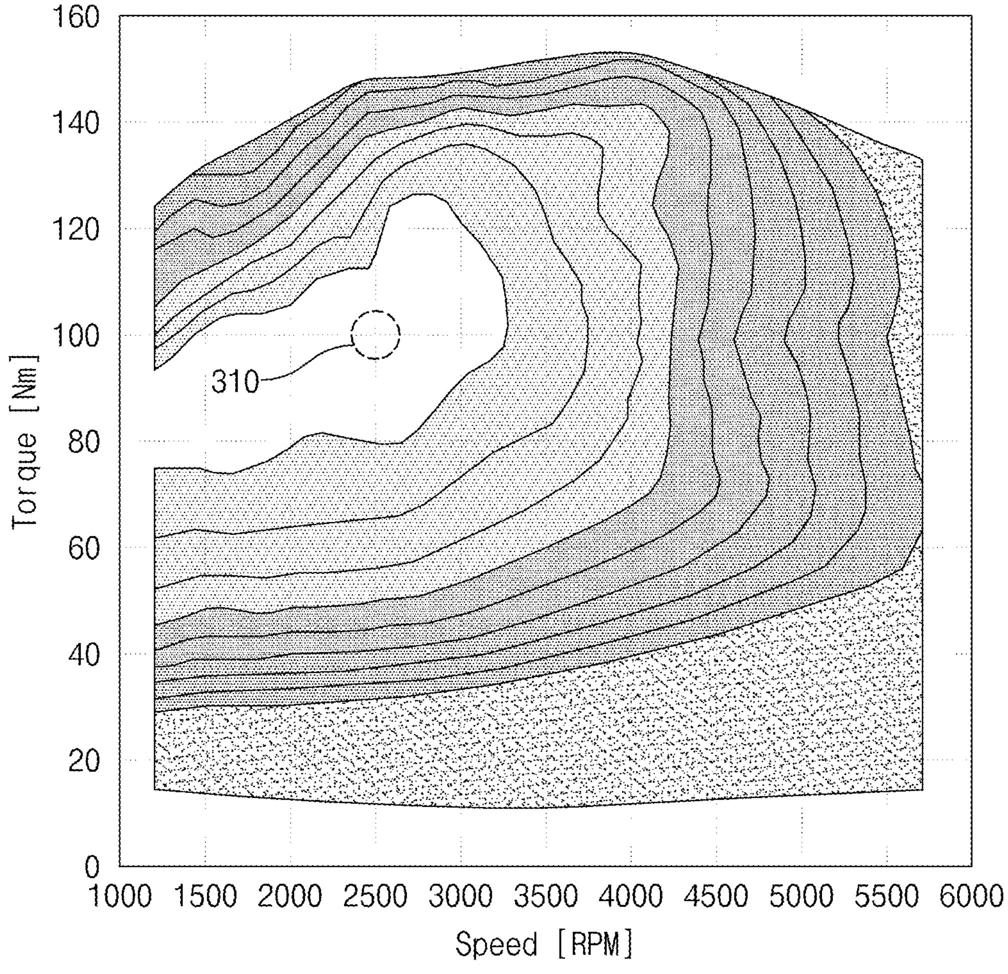
FIG. 3 is a drawing illustrating an example of an engine efficiency map for describing a range of a required power value of a host vehicle according to a vehicle control apparatus according to an embodiment of the present disclosure.

FIG. 3 is a drawing illustrating an example of an engine efficiency map for describing a range of a required power value of a host vehicle according to a vehicle control apparatus according to an embodiment of the present disclosure.

According to an embodiment, the efficiency of an engine may be calculated by a speed and torque.

Referring to FIG. 3, a lightly shaded portion on the engine efficiency map may refer to an area where the efficiency of the engine is good.

According to an embodiment, in a condition in which a required power value of a host vehicle is within a range of a predetermined power value among conditions for updating past operation data that are described with reference to FIG. 1, the vehicle control apparatus may set the range of the predetermined power value with reference to the engine efficiency map.

According to an embodiment, the vehicle control apparatus may set the range of the predetermined power value described above based on a reference power value 310 of the area with good efficiency on the engine efficiency map. For example, the on/off of the engine may be determined on the basis of the reference power value 310. As an example, the range of the predetermined power value may be set within 0 kW and the reference power value 310.

Figure 4:
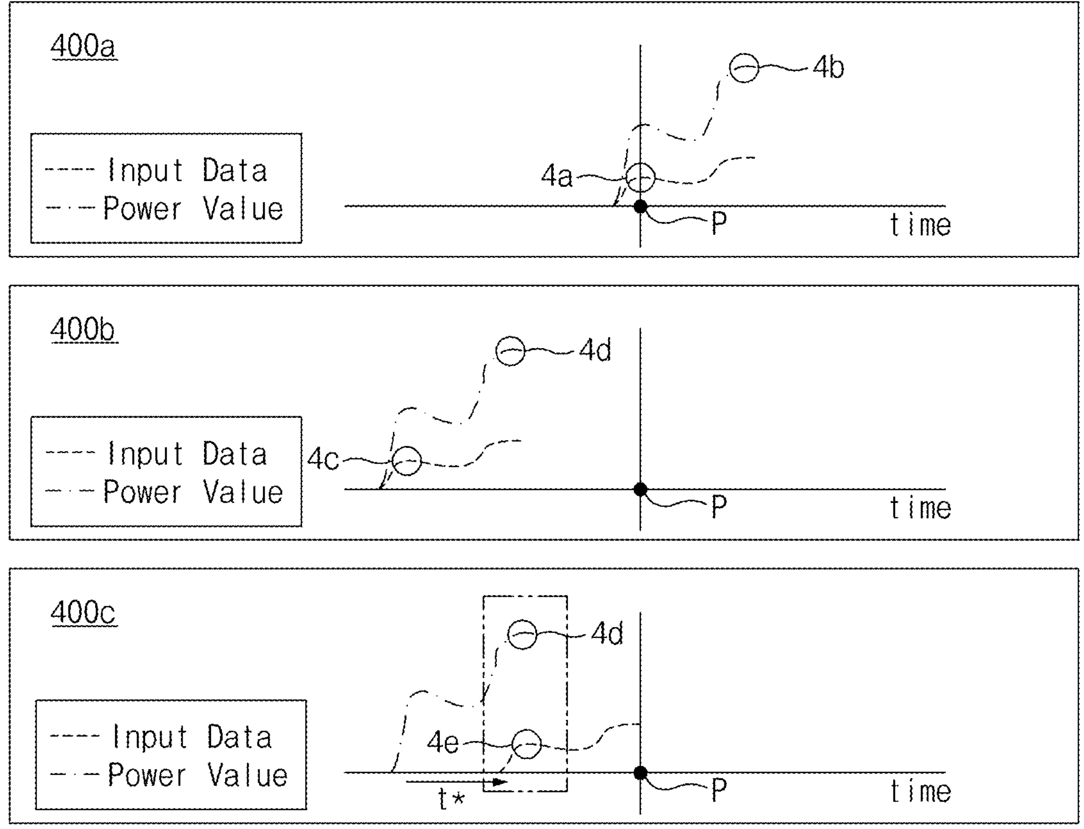
FIG. 4 is a drawing illustrating an example in which a vehicle control apparatus according to an embodiment of the present disclosure offsets input data at a past time point, which corresponds to input data at a current time point, by a specific time.

FIG. 4 is a drawing illustrating an example in which a vehicle control apparatus according to an embodiment of the present disclosure offsets input data at a past time point, that corresponds to input data at a current time point, by a specific time.

FIG. 4 according to an embodiment illustrates a graph for input data and a graph for a power value corresponding to the input data. A graph 400*a* may depict current operation data of a host vehicle. and Graphs 400*b* and 440*c* depict past operation data of the host vehicle.

Referring to the graph 400*a*, input data 4*a* at a current time point P and a required power value 4*b* at a future time point to be predicted are represented. For example, the future time point to be predicted may be a time point when a specific time elapses from the current time point P.

According to an embodiment, the vehicle control apparatus may apply the input data 4*a* at the current time point P to a vehicle required power model to which a model characteristic beta value is applied, thus predicting a required power value 4*b* at a future time point.

Referring to the graph 400*b*, the vehicle control apparatus may calculate a model characteristic beta value based on past operation data of the host vehicle.

For example, the vehicle control apparatus may use the past operation data of the host vehicle to calculate the model characteristic beta value. The vehicle control apparatus may identify input data 4*c* at a first past time point, which corresponds to the input data 4*a* at the current time point P. The vehicle control apparatus may identify a past power value 4*d* of the host vehicle at a second past time point, that corresponds to the required power value 4*b* at the future time point.

According to an embodiment, the second past time point may be a time point when the specific time elapses from the first past time point. For example, the future time point to be predicted may be a time point when the specific time elapses from the current time point P, and the second past time point may be a time point when the specific time point elapses from the first past time point. In other words, a time interval between the current time point P and the future time point and a time interval between the first past time point and the second past time point may be the same as each other.

Referring to the graph 400*ct*, the vehicle control apparatus may offset the input data 4*c* at the first past time point to the second past time point by the specific time. The vehicle control apparatus may match the offset input data 4*e* at the first past time point with the past power value 4*d* of the host vehicle at the second past time point.

According to an embodiment, the vehicle control apparatus may match the offset input data 4*e* at the first past time point with the past power value 4*d* of the host vehicle at the second past time point to calculate a model characteristic beta value. For example, the vehicle control apparatus may calculate a model characteristic beta value capable of obtaining the past power value 4*d* of the host vehicle at the second past time point by means of the input data 4*e* at the first past time point.

According to an embodiment, the vehicle control apparatus may use the calculated model characteristic beta value to predict the required power value 4*b* of the host vehicle at the future time point based on the input data 4*a* at the current time point.

Referring to FIG. 4, the vehicle control apparatus may apply the model characteristic beta value calculated from the past operation data of the host vehicle to the input data 4*a* at the current time point to predict the required power value 4*b* of the host vehicle at the future time point.

Figure 5:
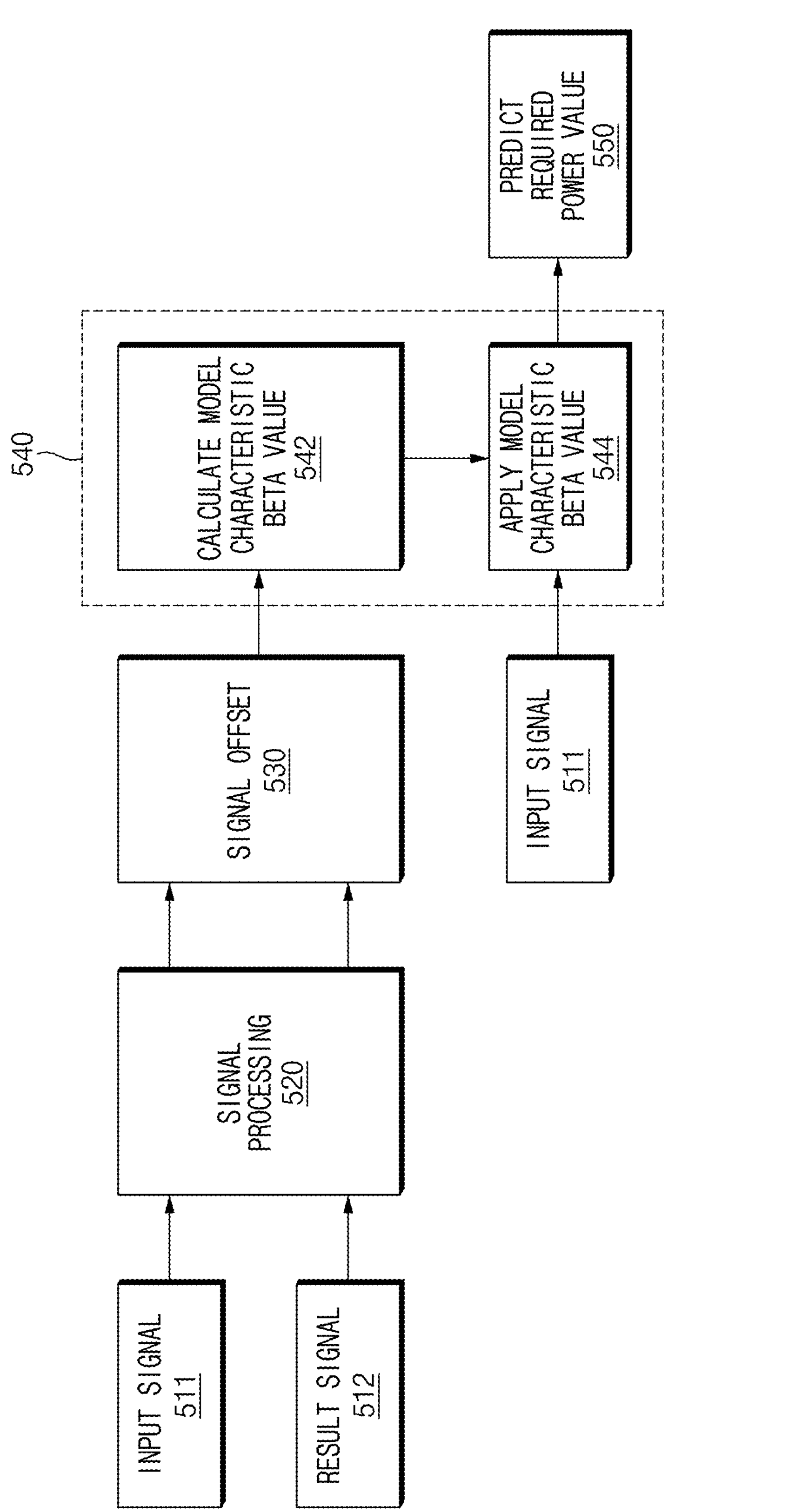
FIG. 5 is a block diagram illustrating an example in which a vehicle control apparatus according to an embodiment of the present disclosure calculates a model characteristic beta value and applies the model characteristic beta value to an input signal.

FIG. 5 is a block diagram illustrating an example in which a vehicle control apparatus according to an embodiment of the present disclosure calculates a model characteristic beta value and applies the model characteristic beta value to an input signal.

According to an embodiment, the vehicle control apparatus may obtain an input signal 511 and/or a result signal 512. For example, the input signal 511 may include a relative speed between a preceding vehicle and a vehicle, a speed of the vehicle, gradient information of a road ahead, or a power value of the vehicle. For example, the result signal 512 may include a required power value of the vehicle.

According to an embodiment, the vehicle control apparatus may perform signal processing 520 for the input signal 511 and/or the result signal 512. For example, the vehicle control apparatus may select a signal which affects model configuration in the input signal 511. According to an embodiment, the vehicle control apparatus may perform the same process as the input signal 511, as described below, for the result signal 512.

According to an embodiment, the vehicle control apparatus may select data with great importance to predict a required power value in the input signal 511, by means of the signal processing 520. For example, the vehicle control apparatus may select the input signal 511 satisfying a predetermined update condition. As an example, the vehicle control apparatus may select only the input signal 511 obtained if the vehicle is traveling, if a preceding vehicle is detected in front of the vehicle, if an external object is not detected within a threshold distance from the vehicle, or if a required power value of the vehicle at the future time point is within a range of a predetermined power value.

According to an embodiment, the vehicle control apparatus may update the selected input signal 511 to past operation data of the vehicle. For example, the vehicle control apparatus may add the input signal 511 at the current time point to the past operation data of the vehicle or may change past operation data of the vehicle, that corresponds to the input signal 511 at the current time point, to the input signal 511 at the current time point.

According to an embodiment, the vehicle control apparatus may identify the past operation data corresponding to the input signal 511 at the current time point and may identify a time point of the past operation data as a first past time point. The vehicle control apparatus may obtain a past power value of the vehicle at a second past time point when a specific time elapses from the first past time point.

According to an embodiment, the vehicle control apparatus may perform a signal offset 530 for an input signal at the first past time point. According to an embodiment, the vehicle control apparatus may offset the input signal at the first past time point by the specific time and may match the offset input signal at the first past time point with the past power value of the vehicle at the second past time point.

According to an embodiment, the vehicle control apparatus may calculate a model characteristic beta value 542 by means of a vehicle required power model 540. According to an embodiment, the vehicle control apparatus may match the offset input signal at the first past time point with the past power value of the vehicle at the second past time point to calculate the model characteristic beta value 542. As an example, the vehicle control apparatus may calculate a model characteristic beta value 542 capable of obtaining the past power value of the vehicle at the second past time point by means of the input signal at the first past time point.

According to an embodiment, the vehicle control apparatus may apply the model characteristic beta value to the input signal 511 at the current time point by means of the vehicle required power model 540. For example, the vehicle control apparatus may apply the model characteristic beta value to the input signal 511 at the current time point to calculate a required power value of the vehicle at a future time point.

According to an embodiment, the vehicle control apparatus value apply the model characteristic beta value calculated from the past operation data of the vehicle to the input signal 511 at the current time point to predict the required power value 550 of the host vehicle at the future time point.

Figure 6:
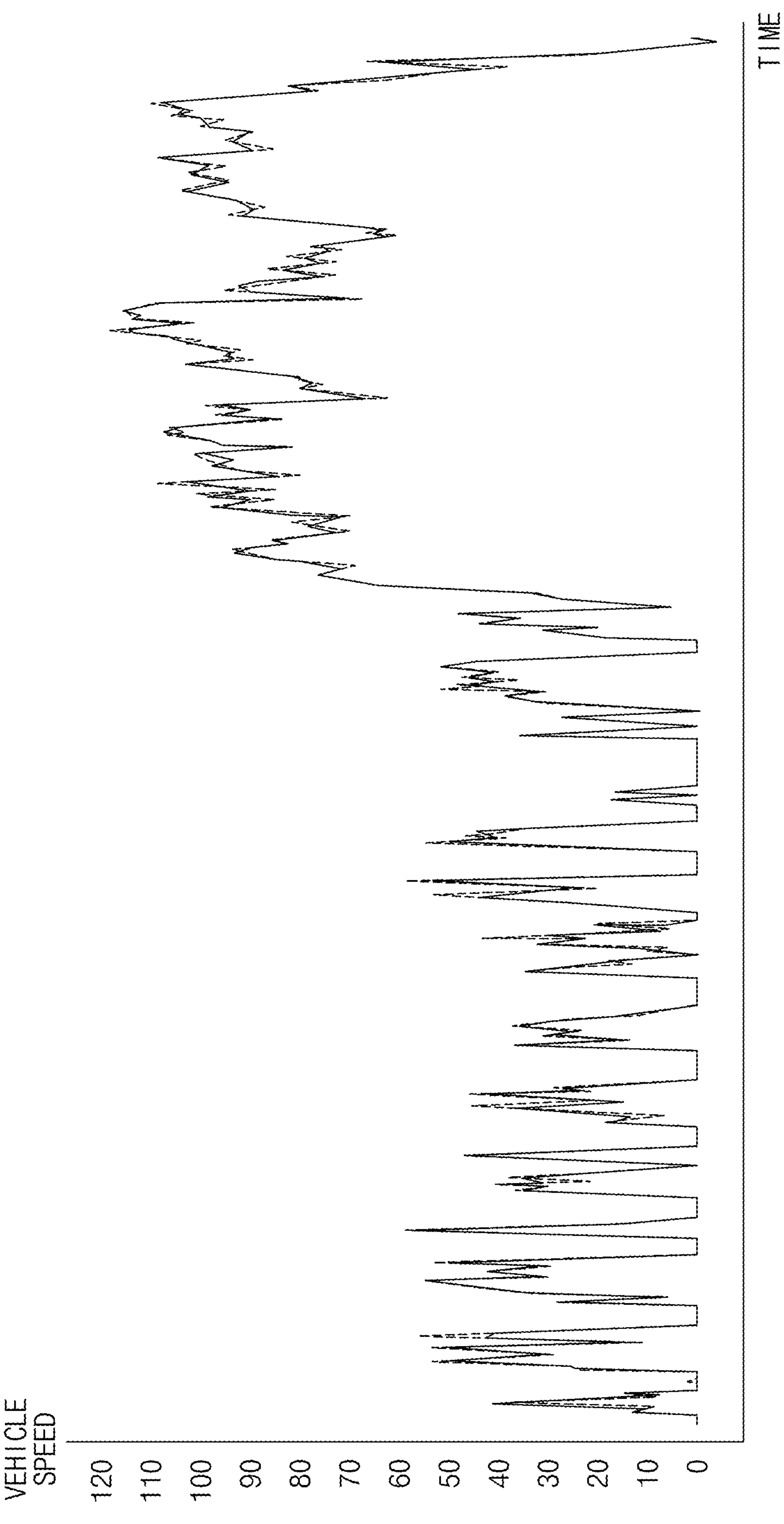
FIG. 6 is a graph illustrating an example of a vehicle speed that changes depending on a driving environment, in conjunction with a vehicle control apparatus according to an embodiment of the present disclosure.

FIG. 6 is a graph illustrating an example of a vehicle speed which changes depending on a driving environment, in conjunction with a vehicle control apparatus according to an embodiment of the present disclosure.

According to an embodiment, the vehicle control apparatus may collect data about operation of a vehicle that changes depending on a driving environment. For example, the vehicle control apparatus may collect data about a vehicle speed which changes depending on a driving environment.

FIG. 6 illustrates an example in which a vehicle speed increases or decreases depending on a driving environment of a vehicle. For example, the vehicle may repeatedly stop and travel and may increase or decrease in vehicle speed while driving.

According to an embodiment, if operation data of the vehicle that changes depending on a driving environment is sufficiently secured, the vehicle control apparatus may predict a required power value of the vehicle based on the operation data of the vehicle.

According to an embodiment, if operation data satisfying a specific condition is sufficiently secured, the vehicle control apparatus may predict a required power value of the vehicle based on the operation data.

For example, if the driving time of the vehicle is greater than or equal to a specific time and data for a change in speed of the vehicle is sufficiently secured during the driving time, the vehicle control apparatus may use it to predict a required power value. As an example, if the driving time of the vehicle is greater than or equal to 15 minutes and data corresponding to the change in speed of the vehicle during 15 minutes is present in past operation data, the vehicle control apparatus may predict a required power value based on the past operation data.

Hereinafter, a vehicle control apparatus or a vehicle control method, according to embodiments of the present disclosure, are described in more detail below with reference to FIGS. 7 and 8.

Hereinafter, it is assumed that the vehicle control apparatus 100 of FIG. 1 performs processes or operations of FIG. 7 or 8. Furthermore, in the description of FIG. 7 or 8, an operation described as being performed by a vehicle control apparatus may be understood as being controlled by the processor 110 of the vehicle control apparatus 100.

Figure 7:
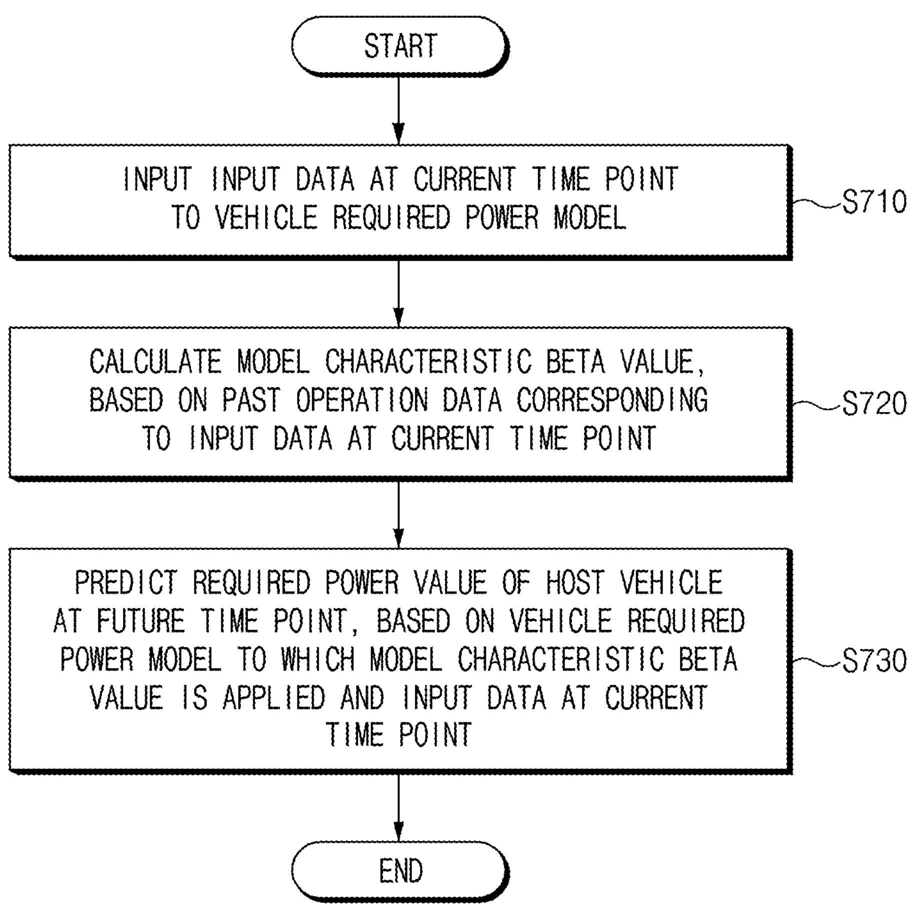
FIG. 7 is a flowchart for describing a vehicle control apparatus or a vehicle control method, according to an embodiment of the present disclosure.

FIG. 7 is a flowchart for describing a vehicle control apparatus or a vehicle control method, according to an embodiment of the present disclosure.

According to an embodiment, operations described below may be performed by a processor included in the vehicle control apparatus.

In an operation S710, the vehicle control apparatus may provide (e.g., input) input data at a current time point to a vehicle required power model. According to an embodiment, the input data at the current time point may include a relative speed between a preceding vehicle and a host vehicle, a speed of the host vehicle, gradient information of a road ahead, and/or a power value of the host vehicle.

In an operation S720, the vehicle control apparatus may calculate a model characteristic beta value to predict a required power value of the host vehicle at a future time point, based on past operation data of the host vehicle, that corresponds to the input data at the current time point provided to the vehicle required power model.

In an operation S730, the vehicle control apparatus may predict the required power value of the host vehicle at the future time point based on the vehicle required power model to which the model characteristic beta value is applied and the input data at the current time point. For example, the vehicle control apparatus may apply the calculated model characteristic beta value to the input data at the current time point to calculate the required power value of the vehicle at a future time point.

Figure 8:
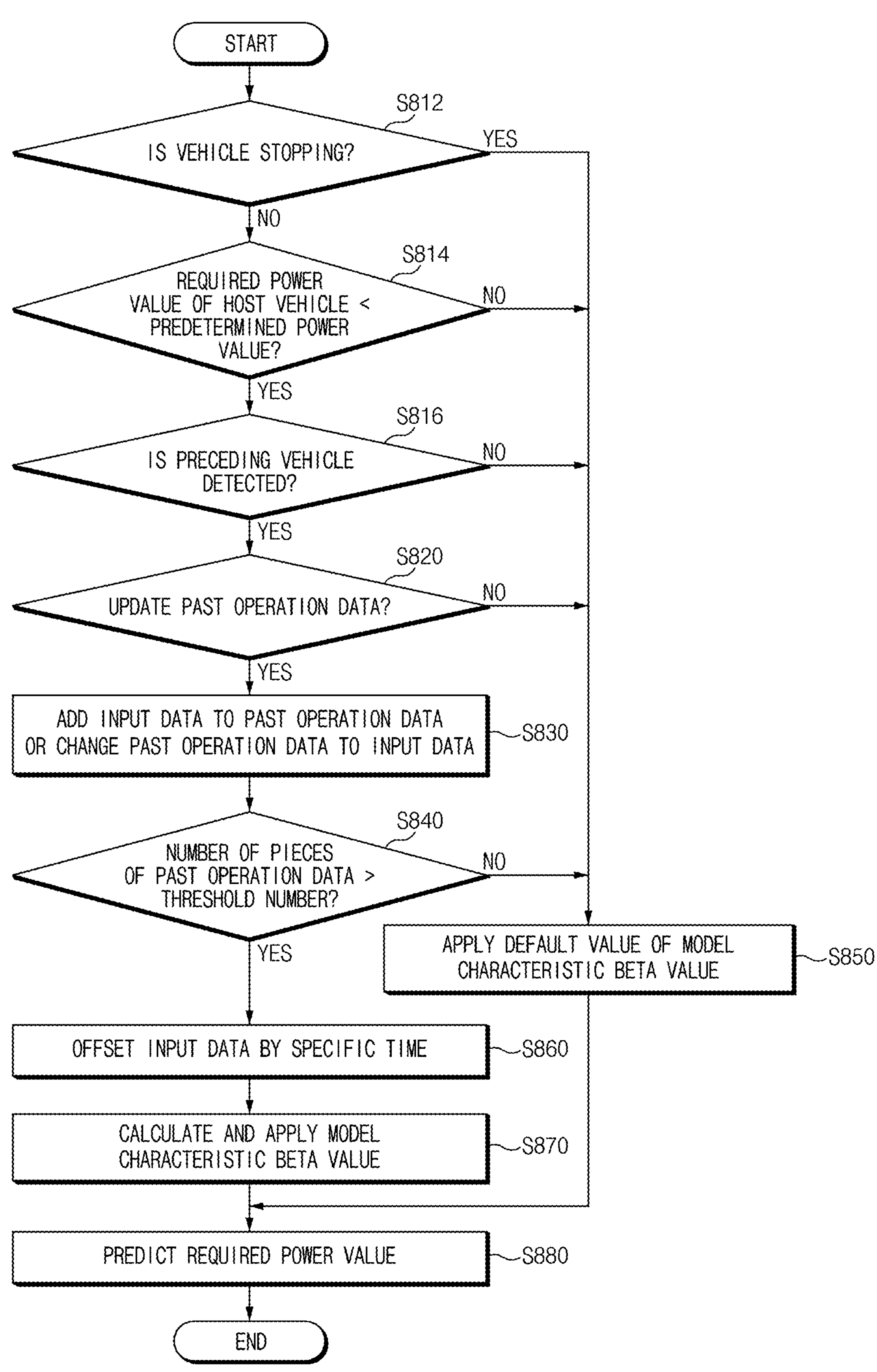
FIG. 8 is a flowchart illustrating an example of predicting a required power value based on updated past operation data, in a vehicle control apparatus or a vehicle control method according to an embodiment of the present disclosure.

FIG. 8 is a flowchart illustrating an example of predicting a required power value based on updated past operation data, in a vehicle control apparatus or a vehicle control method according to an embodiment of the present disclosure.

In an operation S812, the vehicle control apparatus may determine whether a vehicle is stopping. For example, if the vehicle is stopping, in an operation S850, the vehicle control apparatus may apply a default value of a model characteristic beta value to predict a required power value.

According to an embodiment, if the vehicle is traveling, in an operation S814, the vehicle control apparatus may determine whether the required power value of the host vehicle is within a predetermined power value. The range of the predetermined power value may include a range of a power value for determining whether to drive the engine of the host vehicle. For example, the range of the predetermined power value may be set to a range within a minimum power value and a maximum power value for determining whether to drive the engine of the host vehicle.

According to an embodiment, if the required power value of the host vehicle is not within the predetermined power value, in an operation S850, the vehicle control apparatus may apply the default value of the model characteristic beta value to predict the required power value.

According to an embodiment, if the required power value of the host vehicle is within the predetermined power value, in S816, the vehicle control apparatus may determine whether a preceding vehicle is detected ahead. For example, if the preceding vehicle is not detected ahead, in an operation S850, the vehicle control apparatus may apply the default value of the model characteristic beta value to predict the required power value.

According to an embodiment, if the preceding vehicle is detected ahead, in an operation S820, the vehicle control apparatus may update input data obtained at the current time point to past operation data. The input data at the current time point may include a relative speed between the preceding vehicle and the host vehicle, a speed of the host vehicle, gradient information of a road ahead, or a power value of the host vehicle.

According to an embodiment, only if all of the conditions in the operations S812-S816 described above are met, in an operation S820, the vehicle control apparatus may update the input data obtained at the current time point to the past operation data. However, this is merely an example. In another embodiment, if any one of the conditions in the operations S812-S816 described above is met, the vehicle control apparatus may update the input data obtained at the current time point to the past operation data.

According to an embodiment, if updating the input data obtained at the current time point to the past operation data, in an operation S830, the vehicle control apparatus may add the input data at the current time point to the past operation data of the host vehicle or may change past operation data of the host vehicle, that corresponds to the input data at the current time point, to the input data at the current time point.

According to an embodiment, in an operation S840, the vehicle control apparatus may determine whether the number of pieces of past operation data is greater than a threshold number. For example, the threshold number may include the number of pieces of past operation data enough for the vehicle control apparatus to calculate a model characteristic beta value by means of a vehicle required power model. For example, if the number of the pieces of past operation data is not greater than the threshold number, in an operation S850, the vehicle control apparatus may apply the default value of the model characteristic beta value to predict the required power value.

According to an embodiment, if the number of the pieces of past operation data is greater than the threshold number, the vehicle control apparatus may predict the required power value of the vehicle based on the past operation data.

For example, the vehicle control apparatus may identify past operation data corresponding to the input data at the current time point and may identify a time point of the past operation data as a first past time point. The vehicle control apparatus may obtain a past power value of the vehicle at a second past time point when a specific time elapses from the first past time point.

In an operation S860, the vehicle control apparatus may offset input data at the first past time point by the specific time. In detail, the vehicle control apparatus may offset the input data at the first past time point by the specific time and may match the offset input data at the first past time point with the past power value of the vehicle at the second past time point.

In an operation S870, the vehicle control apparatus may match the offset input data at the first past time point with the past power value of the vehicle at the second past time point to calculate the model characteristic beta value. In S870, the vehicle control apparatus may apply the model characteristic beta value to the input data at the current time point by means of the vehicle required power model.

In an operation S880, the vehicle control apparatus may apply the model characteristic beta value calculated from the past operation data of the vehicle to the input data at the current time point to predict the required power value of the vehicle at the future time point.

Figure 9:
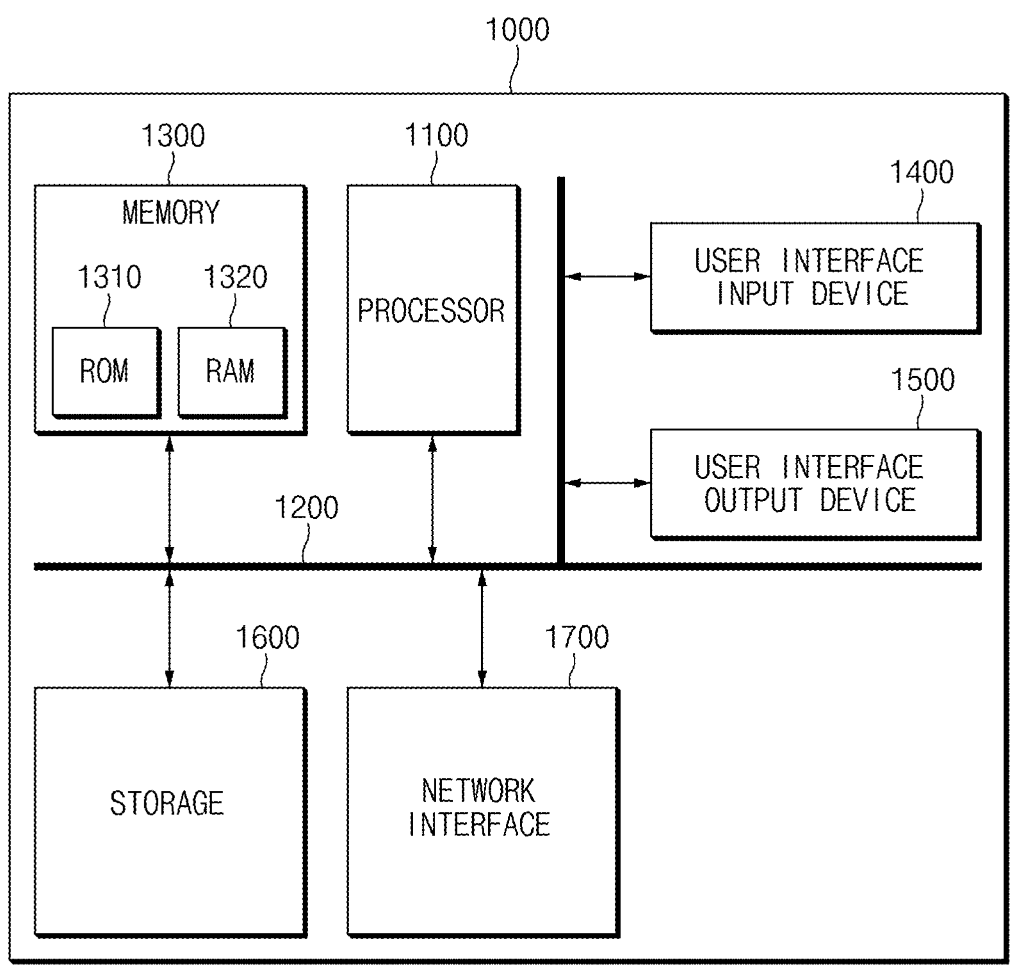
FIG. 9 illustrates a computing system associated with a vehicle control apparatus or a vehicle control method according to an embodiment of the present disclosure.

FIG. 9 illustrates a computing system associated with a vehicle control apparatus or a vehicle control method, according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the methods or algorithms according to the embodiments of the present disclosure may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another embodiment, the processor and the storage medium may reside in the user terminal as separate components.

Embodiments of the present disclosure may predict required power in the future by means of a prediction model trained based on past data of the vehicle.

Furthermore, embodiments of the present disclosure may predict required power using only input data matched with a specific condition, thus minimizing the amount of calculation of the prediction model.

Furthermore, embodiments of the present disclosure may control a state of charge (SOC) based on the predicted required power, thus improving fuel efficiency or fuel economy.

Furthermore, embodiments of the present disclosure may control the vehicle based on the predicted required power, thus improving the marketability of the vehicle.

In addition, various effects ascertained directly or indirectly through the present disclosure may be provided.

Hereinabove, although the present disclosure has been described with reference to several embodiments and the accompanying drawings, the present disclosure is not limited thereto. Rather, the present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure, but are provided only for illustrative purposes. The scope of the present disclosure should be construed on the basis of the accompanying claims, and all the technical ideas within the scope equivalent to the claims should be included in the scope of the present disclosure.

What is claimed is:

1. A vehicle control apparatus, comprising:

a memory storing a program instruction; and a processor configured to execute the program instruction, wherein the processor is configured to:

provide input data at a current time point to a vehicle required power model for predicting a required power value of a host vehicle at a future time point when a specific time elapses from the current time point, wherein the input data includes at least one of a relative speed between a preceding vehicle and a host vehicle, a speed of the host vehicle, gradient information of a road ahead of the host vehicle, or a power value of the host vehicle;

calculate a model characteristic beta value to predict the required power value of the host vehicle at the future time point based on pieces of past operation data of the host vehicle, wherein the pieces of past operation data correspond to the input data at the current time point;

predict the required power value of the host vehicle at the future time point based on the vehicle required power model to which the model characteristic beta value is applied and the input data at the current time point; and perform one or both of i) control the host vehicle in an electric vehicle (EV) mode based on the required power value of the host vehicle at the future time point or ii) control the host vehicle in a hybrid electric vehicle (HEV) mode based on the required power value of the host vehicle at the future time point.

2. The vehicle control apparatus of claim 1, wherein the processor is configured to:

offset input data at a first past time point, the input data corresponding to the input data at the current time point, among the pieces of past operation data of the host vehicle;

obtain a past power value of the host vehicle at a second past time point when the specific time elapses from the first past time point; and match the offset input data at the first past time point with the past power value of the host vehicle at the second past time point to calculate the model characteristic beta value.

3. The vehicle control apparatus of claim 1, wherein the processor is configured to:

offset input data at a first past time point, the input data corresponding to the input data at the current time point, among the pieces of past operation data of the host vehicle by each of respective separate times, based on determining that i) there is a plurality of time points between the current time point and the future time point when the specific time elapses from the current time point and ii) the plurality of time points are identified as time points when the respective separate times elapse from the current time point;

obtain past power values of the host vehicle at each of the plurality of past time points when the respective separate times elapse from the first past time point;

match each of the pieces of offset input data at the first past time point with the past power values of the host vehicle at each of the plurality of past time points, depending on the respective separate times, to calculate model characteristic beta values for every time point among the plurality of time points; and obtain a set of the model characteristic beta values, the set including the model characteristic beta values calculated for every time point among the plurality of time points.

4. The vehicle control apparatus of claim 1, wherein the processor is configured to perform one of:

add the input data at the current time point to the pieces of past operation data of the host vehicle to update the pieces of past operation data of the host vehicle, or change the pieces of past operation data of the host vehicle to the input data at the current time point to update the pieces of past operation data of the host vehicle, wherein the pieces of past operation data correspond to the input data at the current time point.

5. The vehicle control apparatus of claim 4, wherein the processor is configured to:

update the pieces of past operation data of the host vehicle based on determining that a predetermined update condition is met, the predetermined update condition including at least one of:

that the host vehicle is traveling, that the preceding vehicle is detected in front of the host vehicle, that an external object is not detected within a threshold distance from the host vehicle, or that the required power value of the host vehicle at the future time point is within a range of a predetermined power value.

6. The vehicle control apparatus of claim 5, wherein the range of the predetermined power value includes a range of a power value for determining whether to drive an engine of the host vehicle.

7. The vehicle control apparatus of claim 1, wherein the processor is configured to calculate the model characteristic beta value based on determining that a number of the pieces of past operation data of the host vehicle is greater than a threshold number.

8. The vehicle control apparatus of claim 5, wherein the processor is configured to predict the required power value of the host vehicle at the future time point, based on the vehicle required power model to which a default value of the model characteristic beta value is applied and the input data at the current time point, when the predetermined update condition is not met or a number of the pieces of past operation data of the host vehicle is less than or equal to a threshold number.

9. The vehicle control apparatus of claim 1, wherein the vehicle required power model includes a model using a linear least square (LSQ).

10. A vehicle control method, comprising:

inputting, by a processor, input data at a current time point to a vehicle required power model for predicting a required power value of a host vehicle at a future time point when a specific time elapses from the current time point, wherein the input data includes at least one of a relative speed between a preceding vehicle and a host vehicle, a speed of the host vehicle, gradient information of a road ahead, or a power value of the host vehicle;

calculating, by the processor, a model characteristic beta value to predict the required power value of the host vehicle at the future time point based on pieces of past operation data of the host vehicle, wherein the pieces of past operation data correspond to the input data at the current time point;

predicting, by the processor, the required power value of the host vehicle at the future time point based on the vehicle required power model to which the model characteristic beta value is applied and the input data at the current time point; and performing one or both of i) controlling, by the processor, the host vehicle in an electric vehicle (EV) mode based on the required power value of the host vehicle at the future time point or ii) controlling, by the processor, the host vehicle in a hybrid electric vehicle (HEV) mode based on the required power value of the host vehicle at the future time point.

11. The vehicle control method of claim 10, wherein calculating the model characteristic beta value includes:

offsetting, by the processor, input data at a first past time point, the input data corresponding to the input data at the current time point, among the pieces of past operation data of the host vehicle;

obtaining, by the processor, a past power value of the host vehicle at a second past time point when the specific time elapses from the first past time point; and matching, by the processor, the offset input data at the first past time point with the past power value of the host vehicle at the second past time point to calculate the model characteristic beta value.

12. The vehicle control method of claim 10, wherein calculating the model characteristic beta value includes:

identifying, by the processor, that i) there is a plurality of time points between the current time point and the future time point when the specific time elapses from the current time point and ii) the plurality of time points are time points when respective separate times elapse from the current time point;

offsetting, by the processor, input data at a first past time point, the input data corresponding to the input data at the current time point, among the pieces of past operation data of the host vehicle by each of the respective separate times;

obtaining, by the processor, past power values of the host vehicle at each of the plurality of past time points when the respective separate times elapse from the first past time point;

matching, by the processor, each of the pieces of offset input data at the first past time point with the past power values of the host vehicle at each of the plurality of past time points, depending on the respective separate times, to calculate model characteristic beta values for every time point among the plurality of time points; and obtaining, by the processor, a set of the model characteristic beta values, the set including the model characteristic beta values calculated every time point among the plurality of time points.

13. The vehicle control method of claim 10, wherein inputting the input data at the current time point to the vehicle required power model includes one of:

i) adding, by the processor, the input data at the current time point to the pieces of past operation data of the host vehicle to update the pieces of past operation data of the host vehicle, or ii) changing, by the processor, the pieces of past operation data of the host vehicle to the input data at the current time point to update the pieces of past operation data of the host vehicle, wherein the pieces of past operation data correspond to the input data at the current time point.

14. The vehicle control method of claim 13, wherein adding the input data at the current time point to the pieces of past operation data of the host vehicle or changing the pieces of past operation data of the host vehicle to the input data at the current time point includes:

updating, by the processor, the pieces of past operation data of the host vehicle based on determining that a predetermined update condition is met, the predetermined update condition including at least one of:

that the host vehicle is traveling, that the preceding vehicle is detected in front of the host vehicle, that an external object is not detected within a threshold distance from the host vehicle, or that the required power value of the host vehicle at the future time point is within a range of a predetermined power value.

15. The vehicle control method of claim 14, wherein the range of the predetermined power value includes a range of a power value for determining whether to drive an engine of the host vehicle.

16. The vehicle control method of claim 10, wherein calculating the model characteristic beta value includes calculating, by the processor, the model characteristic beta value based on determining that a number of the pieces of past operation data of the host vehicle is greater than a threshold number.

17. The vehicle control method of claim 14, wherein predicting the required power value of the host vehicle at the future time point includes predicting, by the processor, the required power value of the host vehicle at the future time point based on the vehicle required power model to which a default value of the model characteristic beta value is applied and the input data at the current time point, when the predetermined update condition is not met or a number of the pieces of past operation data is less than or equal to a threshold number.

18. The vehicle control method of claim 10, wherein the vehicle required power model includes a model using a linear least square (LSQ).

* * * * *